US012016809B2

(12) United States Patent
Buccieri et al.

(10) Patent No.: US 12,016,809 B2
(45) Date of Patent: Jun. 25, 2024

(54) HEAD EXTENSION AND TRANSPORT HANDLE SYSTEM

(71) Applicant: Hill-Rom Services, Inc., Batesville, IN (US)

(72) Inventors: Michael Buccieri, Greenfield, IN (US); Robert Mark Zerhusen, Cincinnati, OH (US); Richard Henry Heimbrock, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 18/132,577

(22) Filed: Apr. 10, 2023

(65) Prior Publication Data

US 2023/0277396 A1 Sep. 7, 2023

Related U.S. Application Data

(63) Continuation of application No. 16/936,584, filed on Jul. 23, 2020, now Pat. No. 11,648,162.
(Continued)

(51) Int. Cl.
*A61G 7/00* (2006.01)
*A61G 7/015* (2006.01)
(Continued)

(52) U.S. Cl.
CPC ............. *A61G 7/018* (2013.01); *A61G 7/015* (2013.01); *A61G 7/0503* (2013.01); *G05G 1/06* (2013.01); *A61G 2203/10* (2013.01)

(58) Field of Classification Search
CPC .......... A61G 7/00; A61G 7/018; A61G 7/015; A61G 7/0503; A61G 2203/10; G05G 1/06
See application file for complete search history.

(56) References Cited

U.S. PATENT DOCUMENTS 5,069,465 A * 12/1991 Stryker .................. A61G 1/048
403/102
5,094,418 A * 3/1992 McBarnes, Jr. ...... A61G 7/0503
248/308
(Continued)

FOREIGN PATENT DOCUMENTS

EP 2896392 A2 7/2015
EP 3210586 A1 8/2017
(Continued)

OTHER PUBLICATIONS

Zhou, J, Ergonomic evaluation of brake pedal and push handle locations on hospital beds, Applied Ergonomics, Oct. 21, 2016, p. 305-312, 60.

*Primary Examiner* — Fredrick C Conley
(74) *Attorney, Agent, or Firm* — Price Heneveld LLP

(57) ABSTRACT

A patient support apparatus includes a base frame and an upper frame configured to support a mattress. The upper frame has a head portion including a recessed edge. Lift arms are coupled to the upper frame and configured to adjust a position of the upper frame. A first handle is coupled to the head portion on a first side of the recessed edge. A second handle is coupled to the head portion on a second side of the recessed edge. The first and second handles are configured to pivot inboard and toward one another to a lowered position extending over the upper frame adjacent to the recessed edge. An intravenous pole is pivotally coupled to the head portion and is adjustable between a deployed position and a stowed position. The intravenous pole extends along a rear wall of the recessed edge over the upper frame when in the stowed position.

19 Claims, 9 Drawing Sheets

Related U.S. Application Data

(60) Provisional application No. 62/880,708, filed on Jul. 31, 2019.

(51) Int. Cl.

| | |
|---|---|
| ***A61G 7/018*** | (2006.01) |
| ***A61G 7/05*** | (2006.01) |
| ***G05G 1/06*** | (2006.01) |

(56) References Cited

U.S. PATENT DOCUMENTS

| | | | | |
|---|---|---|---|---|
| 7,419,019 | B1 | 9/2008 | White et al. | |
| 7,789,187 | B2 | 9/2010 | Zerhusen et al. | |
| 7,827,634 | B2 | 11/2010 | Stroth et al. | |
| 8,757,308 | B2 | 6/2014 | Bhai et al. | |
| 9,027,183 | B2 | 5/2015 | Childs et al. | |
| 9,205,009 | B2 | 12/2015 | Koors et al. | |
| 9,233,038 | B2 | 1/2016 | Gibson et al. | |
| 10,004,654 | B2 | 6/2018 | Zerhusen et al. | |
| 11,304,866 | B2 | 4/2022 | Knecht et al. | |
| 2006/0031990 | A1* | 2/2006 | Palmatier | A61G 7/0507 5/618 |
| 2008/0141459 | A1* | 6/2008 | Hamberg | A61G 7/0507 180/19.3 |
| 2010/0138999 | A1 | 6/2010 | Westmoreland, II et al. | |
| 2015/0231006 | A1 | 8/2015 | Bhimavarapu et al. | |
| 2015/0238264 | A1 | 8/2015 | Kerns et al. | |
| 2016/0008197 | A1* | 1/2016 | Zerhusen | A61G 7/0533 5/503.1 |
| 2016/0374874 | A1 | 12/2016 | Trepanier et al. | |
| 2018/0161225 | A1 | 6/2018 | Zerhusen et al. | |

FOREIGN PATENT DOCUMENTS

| | | | |
|---|---|---|---|
| EP | 3182947 | B1 | 5/2019 |
| JP | 2004178933 | A | 1/2006 |

* cited by examiner

HEAD EXTENSION AND TRANSPORT HANDLE SYSTEM

CROSS-REFERENCE TO RELATED APPLICATIONS

The present application is a continuation of U.S. patent application Ser. No. 16/936,584, filed Jul. 23, 2020, now U.S. Pat. No. 11,648,162, entitled "MODIFIED HEAD EXTENSION AND TRANSPORT HANDLE SYSTEM", which claims priority to and the benefit under 35 U.S.C. § 119(e) of U.S. Provisional Application No. 62/880,708, filed on Jul. 31, 2019, entitled "MODIFIED HEAD EXTENSION AND TRANSPORT HANDLE SYSTEM," the disclosures of which are hereby incorporated herein by reference in their entirety.

FIELD OF THE DISCLOSURE

The present disclosure generally relates to a head extension and transport handle system for a patient support apparatus.

SUMMARY OF THE DISCLOSURE

According to an aspect of the present disclosure, a patient support apparatus includes a base frame. An upper frame is operably coupled to the base frame. The upper frame has a support surface configured to support a mattress. The upper frame has a head portion that includes a recessed edge. Lift arms are coupled to the upper frame and configured to adjust a position of the upper frame relative to the base frame. A first handle is coupled to the head portion on a first side of the recessed edge. A second handle is coupled to the head portion on a second side of the recessed edge. The first and second handles are configured to pivot inboard and toward one another to a lowered position and extend over the upper frame adjacent to the recessed edge. An intravenous pole is pivotally coupled to the head portion. The intravenous pole is adjustable between a deployed position and a stowed position. The intravenous pole extends along a rear wall of the recessed edge over the upper frame when in the stowed position.

According to another aspect of the present disclosure, an access and transport assembly for a patient support apparatus includes a frame that has a head portion that includes a recessed edge. The recessed edge has first and second sidewalls each extending at an oblique angle from a rear wall. A cover is coupled to the frame proximate the recessed edge. The cover extends over the first and second sidewalls into a space defined by the recessed edge. A first handle is coupled to the head portion adjacent the first sidewall of the recessed edge. A second handle is coupled to the head portion adjacent the second sidewall of the recessed edge. Each of the first and second handles extends at an inboard angle over the cover and at least partially along the rear wall when in a lowered position.

According to a third aspect of the present disclosure, a frame includes a recessed edge. The recessed edge has a rear wall and sidewalls each extending at an obtuse angle from the rear wall. A lift arm is coupled to the frame at a joint proximate the recessed edge. The lift arm is configured to adjust a position of the frame. The lift arm selectively extends into a space defined by the recessed edge. A bumper is coupled to the lift arm proximate the joint. The bumper covers a portion of the lift arm that selectively extends into the space. A handle is coupled to the frame proximate the recessed edge. The handle is configured to pivot inboard to extend at least partially along the rear wall when in a lowered position.

These and other features, advantages, and objects of the present disclosure will be further understood and appreciated by those skilled in the art by reference to the following specification, claims, and appended drawings.

DETAILED DESCRIPTION

Figure 1:
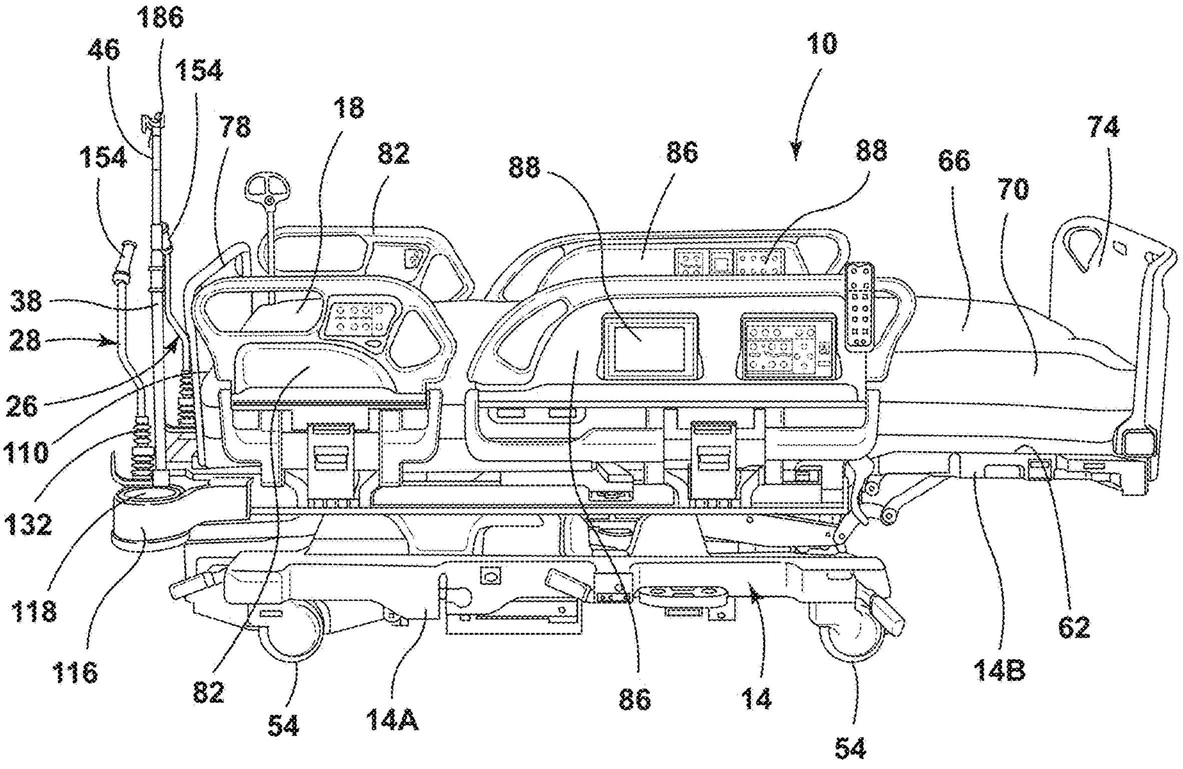
FIG. 1 is a side perspective view of a patient support apparatus, according to the present disclosure.

The present illustrated embodiments reside primarily in combinations of method steps and apparatus components related to a head extension and transport handle system for a patient support apparatus. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-12B, reference numeral 10 generally designates a patient support apparatus that includes a frame 14 that has a head portion 18. The frame 14 includes a recessed edge 22 in the head portion 18. The recessed edge 22 defines a space 24. Handles 26, 28 are pivotally coupled to the frame 14 proximate the head portion 18. Each handle 26, 28 is adjustable between a raised position 30 and a lowered position 34. An elongate support member, such as an intravenous (IV) pole 38, is pivotally coupled to the frame 14 proximate the head portion 18. The IV pole 38 is adjustable between a stowed position 42 and a deployed position 46. A cover 50 is coupled to the frame 14 and aligns with the frame 14 to define the recessed edge 22.

With reference to FIG. 1, the illustrated patient support apparatus 10 is configured as a hospital bed or other medical bed. The patient support apparatus 10 includes the frame 14, which generally includes a base frame 14A and an upper frame 14B. The base frame 14A is supported on casters or wheels 54 that engage with an underlying floor surface. The wheels 54 are coupled to the frame 14 via an axle. The wheels 54 may be configured to rotate in a power drive mode in order to propel the patient support apparatus 10 for transportation by a caregiver, medical professional, or other users.

The base frame 14A supports the upper frame 14B. The upper frame 14B is operable between raised, lowered, and tilted positions relative to the base frame 14A. The upper frame 14B of the patient support apparatus 10 includes a support surface 62, and a support member, such as a mattress 66, which is disposed on the support surface 62 and supported by the upper frame 14B. It is within the scope of the disclosure that the patient support apparatus 10 may be any patient support apparatus 10 known in the art such as, for example, a stretcher, a medical bed, a bed frame, a mattress, other types of beds, surgical tables, examination tables, or any suitable structure for supporting a patient or occupant.

As illustrated in FIG. 1, the frame 14 of the patient support apparatus 10 includes the head portion 18 and a foot portion 70. The head portion 18 and the foot portion 70 of the upper frame 14B may be independently raised, lowered, or tilted relative to the base frame 14A. The patient support apparatus 10 includes a footboard 74 selectively disposed at the foot portion 70 and a headboard 78 selectively disposed at the head portion 18. In the illustrated configuration, the patient support apparatus 10 includes a pair of head siderail assemblies 82 and a pair of foot siderail assemblies 86. The head and foot siderail assemblies 82, 86 may be raised and lowered relative to the frame 14.

In various examples, a user interface 88 is coupled to an external side of at least one siderail of the head and foot siderail assemblies 82, 86. The user interface 88 is configured to accept a user input in order to control functions of the mattress 66 or the patient support apparatus 10. Specifically, the user interface 88 receives commands relating to patient comfort or patient care while the patient is positioned on the patient support apparatus 10. It is contemplated that the user interface 88 may be coupled to an internal side of at least one siderail of the head or foot siderail assemblies 82, 86 to allow the patient on the patient support apparatus 10 to control functions of the mattress 66 or the patient support apparatus 10. For example, the patient may call or alert medical professionals or caregivers through the user interface 88. Additionally or alternatively, the user interface 88 may be coupled to the footboard 74 or the headboard 78. It is contemplated that the user interface 88 may be coupled to any suitable component of the patient support apparatus 10 for access by a patient, a caregiver, or other users.

Figure 2:
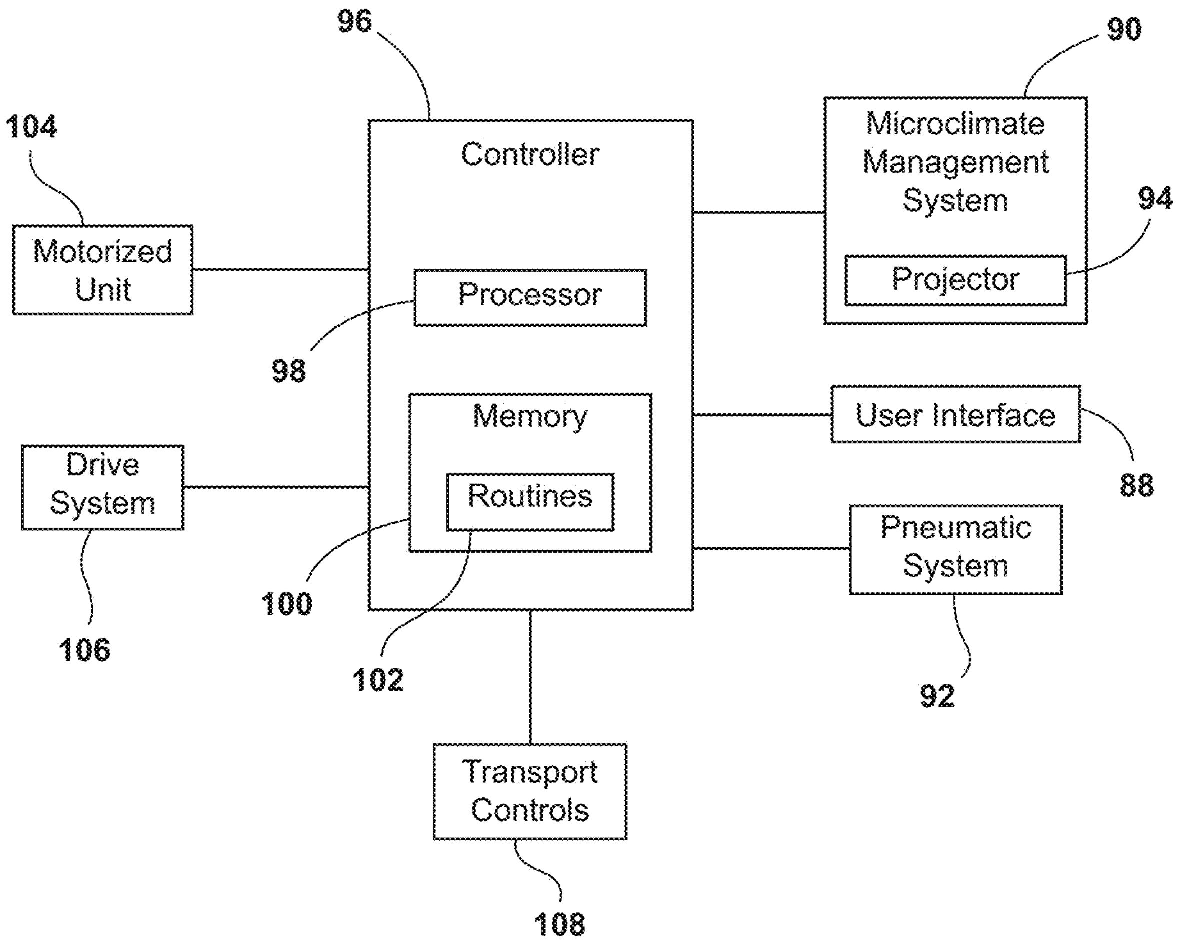
FIG. 2 is a block diagram of a patient support apparatus, according to the present disclosure.

Referring still to FIG. 1 as well as FIG. 2, the patient support apparatus 10 may include various mattress function technologies, such as a microclimate management (MCM) system 90. The MCM system 90 may address shear, friction, pressure, and moisture properties of the mattress 66 in order to optimize patient comfort and to keep the skin of a patient cool and dry, which may aid in the prevention of complications in patient recovery, such as wound prevention. The MCM system 90 may automatically make adjustments based on predetermined therapy functions or manually make adjustments based on user input commands received from the user interface 88. The patient support apparatus 10 may further include a pneumatic system 92 that provides air for the operation of the MCM system 90. Furthermore, the pneumatic system 92 may control airflow in and out of various air bladders or cells of the mattress 66. In some examples, an MCM system status floor indicator may be projected as an image onto the floor surface from a projector 94 coupled with the foot portion 70 of the patient support apparatus 10 to indicate whether the MCM system 90 is on or off, and in what state the MCM system 90 is operating.

The patient support apparatus 10 generally includes a controller 96 having a processor 98, a memory 100, and other control circuitry. Instructions or routines 102 are stored in the memory 100 and executable by the processor 98. The controller 96 is in communication with various aspects of the patient support apparatus 10 to communicate control signals, including, for example, the MCM system 90 and a motorized unit 104. The motorized unit 104 is operably coupled with a drive system 106 connected with the frame 14. In various aspects, the frame 14 may be operable between raised, lowered, and tilted positions. At least one of the handles 26, 28 can include transport controls 108 for operating the motorized unit 104. The caregiver or other medical professional can input a command through the transport controls 108, which may be communicated to the controller 96. Specifically, the transport controls 108 receive commands relating to braking, speed, direction, or other aspects of transporting the patient support apparatus 10. The transport controls 108 on the handles 26, 28 provide more convenient control during transportation of the patient support apparatus 10. The controller 96 may send a corresponding signal to control the patient support apparatus 10 in response to the command.

Figure 3:
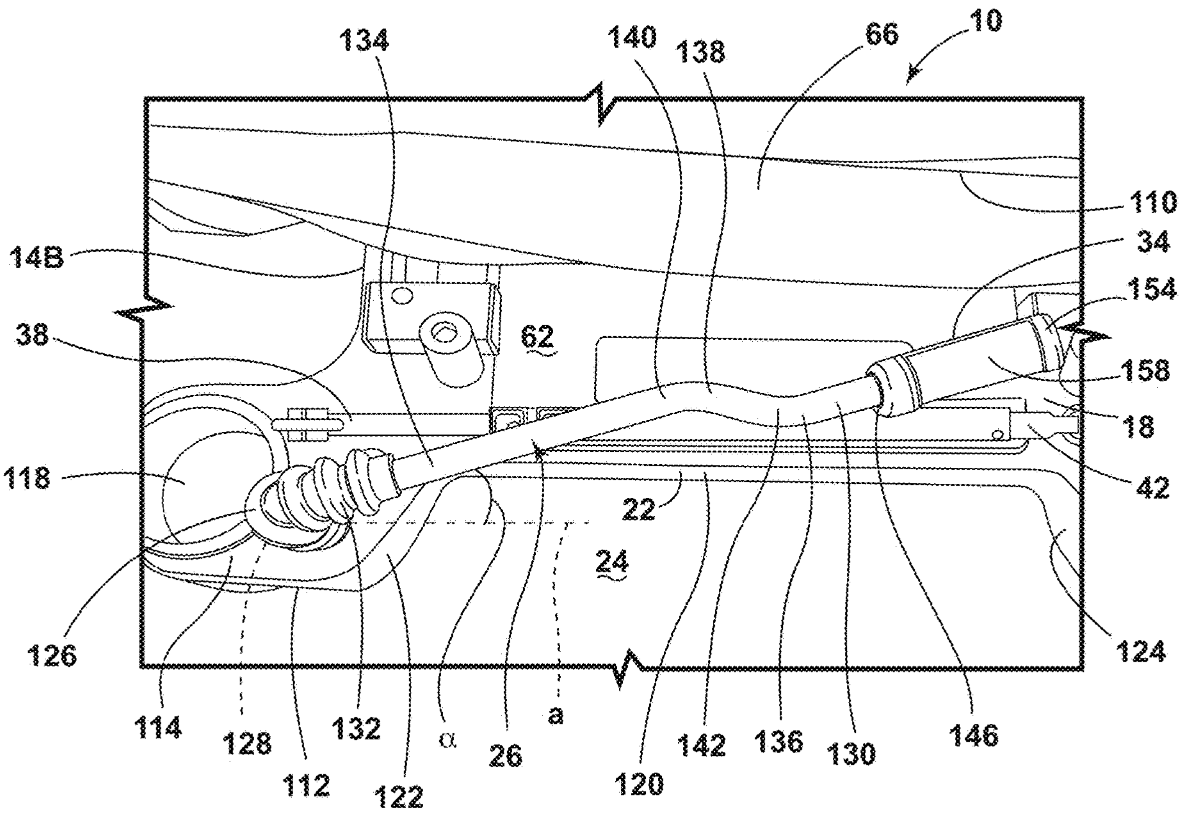
FIG. 3 is a partial top perspective view of a handle for a patient support apparatus, with the handle in a lowered position, according to the present disclosure.

With reference still to FIGS. 1 and 2 as well as FIG. 3, the head portion 18 of the frame 14 extends beyond a periphery 110 of the mattress 66. The head portion 18 is configured to provide an interface between the frame 14 and the handles 26, 28. In some examples, a protective shroud may be placed over portions of the frame 14. The protective shroud may, for example, be positioned between the mattress 66 and the frame 14.

An outer edge 112 of the head portion 18 of the frame 14 generally includes the recessed edge 22 configured to provide additional access to a head area of the patient on the patient support apparatus 10. The recessed edge 22 is generally defined in a central area of the head portion 18 of the frame 14. In various examples, the recessed edge 22 is defined between outwardly extending side projections 114, 116 of the frame 14. The side projections 114, 116 extend laterally outwards from the sides of the frame 14, as well as away from the periphery 110 of the mattress 66 to at least partially define a depth of the recessed edge 22. The side projections 114, 116 each define an opening 118, which may be configured to hold or store medical supplies, such as, for example, an oxygen tank.

The recessed edge 22 is generally trapezoidal-shaped. A rear wall 120 of the recessed edge 22 is disposed inboard of the outer edge 112 of the side projections 114, 116. Opposing sidewalls 122, 124 of the recessed edge 22 extend between the rear wall 120 and the outer edge 112 on the side projections 114, 116. The sidewalls 122, 124 extend at oblique angles from the rear wall 120. In the illustrated example, the sidewalls 122, 124 extend at obtuse angles from the rear wall 120, away from one another. Accordingly, a width of the space 24 defined by the recessed edge 22 may be greater further from the mattress 66 relative to proximate the mattress 66 (e.g., adjacent the rear wall 120). It is also contemplated that the recessed edge 22 may define any practicable shape and/or size for providing the caregiver additional access to the occupant on the patient support apparatus 10. The space 24 is wider adjacent to the outer edge 112 on the side projections 114, 116 relative to the width of the space 24 adjacent to the rear wall 120 of the recessed edge 22 may be advantageous for providing comfort to a caregiver moving within the space 24. The opposing sidewalls 122, 124 extending at oblique or obtuse angles may reduce sharp corners where a caregiver moves around to access the patient on the patient support apparatus 10.

Figure 4:
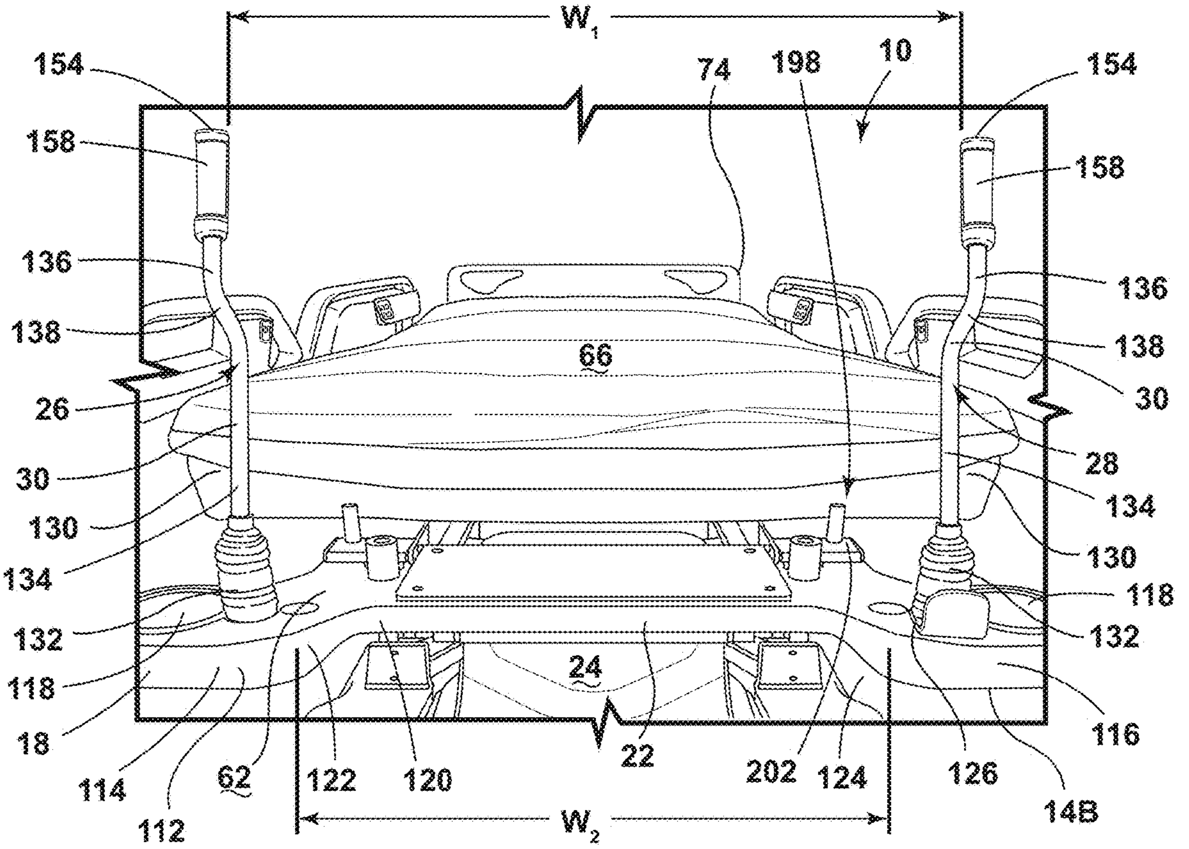
FIG. 4 is a front perspective view of a head portion of a patient support apparatus with a headboard removed, according to the present disclosure.

Referring to FIGS. 3 and 4, the patient support apparatus 10 generally includes two handles 26, 28, however it is contemplated that the patient support apparatus 10 may include a single handle 26. In the illustrated example, the handles 26, 28 are configured as transport handles 26, 28. Each handle 26, 28 is configured to rotate downward into abutment or close proximity to the head portion 18 of the frame 14. Each handle 26, 28 includes a base 126 that is secured to the head portion 18. The base 126 of the handle 26 is secured to one side projection 114 of the frame 14, and the base 126 of the handle 28 is secured to the other side projection 116. It is contemplated that the handles 26, 28 may be secured to any practicable location on the head portion 18 of the frame 14 without departing from the teaching herein.

The bases 126 are pivotally coupled to proximal ends 128 of shafts 130 of the handles 26, 28, respectively. Each handle 26, 28 is operable to rotate or pivot inwardly from the raised position 30 to the lowered position 34. As illustrated in FIG. 3, when in the lowered position 34, the shafts 130 of the handles 26, 28 are abutting or in close proximity to the head portion 18. As illustrated in FIG. 4, when in the raised position 30, the shafts 130 extend generally vertically, normal to a longitudinal extent of the frame 14. Stated differently, when in the raised position 30, the handles 26, 28 extend substantially perpendicular to the support surface 62 of the frame 14, and when in the lowered position 34, the handles 26, 28 extend substantially parallel to the support surface 62 of the frame 14. The handles 26, 28 may be in the form of a metal tube but are not limited to such constructions.

According to various aspects, a protective cover 132 is disposed proximate the proximal end 128 of each handle 26, 28, which generally covers a mechanical or rotational joint configured to fold, or collapse, the handles 26, 28 from the raised position 30. The protective cover 132 may be configured as polymeric bellows. For example, the handles 26, 28 may fold, or rotate, at a 90° angle. However, the handles 26, 28 may fold to any position between vertical and horizontal. In this way, the handles 26, 28 may be stowed on the head portion 18 of the frame 14. The protective cover 132 may fluidly seal the mechanical joint, such that fluids cannot come into contact with the mechanical joint.

Additional space 24 provided by the recessed edge 22 may not be substantially impinged by the handles 26, 28. The handles 26, 28 rotate inwardly, at least partially toward the mattress 66 and partially toward one another (e.g., the opposing handle). The handles 26, 28 rotate inwardly toward the mattress 66 at an angle (e.g., an inboard angle) a in a range of from about 10° to about 30° relative to a lateral axis a extending between the two handles 26, 28 and parallel to the rear wall 120 of the recessed edge 22. In a non-limiting example, the handles 26, 28 may extend at an angle α of about 19°, extending inboard relative to the frame 14. Once again, the handles 26, 28 do not substantially impinge on the space 24 provided by the recessed edge 22 so that the caregiver has additional space to access the patient on the patient support apparatus 10. In addition, it is understood that when in the raised position 30, each handle 26 affords a substantial width $W_1$ of the space 24 that is equal to or greater than a width $W_2$ of the space 24 defined by the recessed edge 22 of the head portion 18. Accordingly, the caregiver has increased access to the patient on the patient support apparatus 10 when each handle 26, 28 is in the raised position 30 and in the lowered position 34.

Referring still to FIGS. 3 and 4, the shape of the shafts 130 may prevent the handles 26, 28 from substantially impinging the space 24 provided by the recessed edge 22. The shaft 130 of each handle 26, 28 includes a proximal portion 134, a distal portion 136, and a connecting portion 138. The proximal and distal portions 134, 136 of the shafts 130 are spaced-apart and offset from one another by the connecting portion 138. Although offset, the proximal and distal portions 134, 136 are generally substantially parallel to one another, with the connecting portion 138 extending at an angle therebetween.

The proximal portion 134 of each shaft 130 extends into the connecting portion 138 via a proximal bend 140, and the connecting portion 138 extends into the distal portion 136 via a distal bend 142. The proximal and distal bends 140, 142 of the shafts 130 may be substantially the same shape or define substantially similar angles between adjacent portions of the shafts 130. In the illustrated configuration, each of the proximal and distal bends 140, 142 define an obtuse angle between adjacent portions of the shafts 130. Accordingly, the obtuse angles are defined between the proximal portion 134 and the connecting portion 138, as well as between the connecting portion 138 and the distal portion 136. In this way, each handle 26, 28 generally defines an elongated Z-shape.

The obtuse angle formed by the proximal bend 140 is generally a mirror image of the obtuse angle defined by the distal bend 142. As such, the proximal and distal portions 134, 136 are positioned in the offset, parallel configuration. As illustrated, the proximal and distal bends 140, 142 each have an arcuate shape. However, it is contemplated that the proximal and distal bends 140, 142 may be a variety of shapes, such as, for example, curved, sloped, or the like. It is also contemplated that the proximal and distal bends 140, 142 may not be substantially similar in shape or may not define substantially similar angles. In such examples, the proximal and distal portions 134, 136 may not be substantially parallel.

Referring still to FIGS. 3 and 4, the handles 26, 28 extend substantially over the frame 14 adjacent to the recessed edge 22 when in the lowered position 34. When in the lowered position 34, the handles 26, 28 extend at least partially over the IV pole 38 when the IV pole 38 is in the stowed position 42. The proximal and distal bends 140, 142, as well as the connecting portion 138, are generally disposed over the IV pole 38. Accordingly, the handles 26, 28 may be stacked over the IV pole 38 for storing the handles 26, 28 and the IV pole 38. Additionally, the stacked configuration of the handles 26, 28 and the IV pole 38 generally prevent the handles 26, 28 and the IV pole 38 from substantially impinging the space 24 defined by the recessed edge 22, and may increase access for the caregiver to the occupant on the patient support apparatus 10. Moreover, the handles 26, 28 may be stored in the lowered position 34 when the patient support apparatus 10 is stationary (e.g., not in transport), allowing increased access to the patient by the caregiver. The configuration of the handles 26, 28 with the angled connecting portion 138 may be advantageous for storing the handles 26, 28 over the frame 14, as well as for storing the patient support apparatus 10.

According to various aspects, a distance between a distal end 146 of each shaft 130 and the connecting portion 138 is less than the distance between the proximal end 128 and the connecting portion 138. Accordingly, the length of the proximal portion 134 is less than the length of the distal portion 136, such that the proximal and distal bends 140, 142 are disposed closer to a grip 154 than the protective cover 132. In this configuration, the proximal portion 134 of each of the shafts 130 extends along the respective sidewall 122, 124, and partially along the rear wall 120. The connecting portion 138 is disposed substantially along or inboard of the rear wall 120 of the recessed edge 22. This configuration also prevents the handles 26, 28 from substantially impinging the space 24 defined by the recessed edge 22 when the handles 26, 28 are in the lowered position 34.

Referring still to FIGS. 3 and 4, each handle 26, 28 includes the grip 154 that extends from the distal end 146 of the shaft 130, or alternatively, may be disposed over the distal end 146 of the shaft 130. In various examples, the grips 154 extend upwardly from the shafts 130 at an angle in a range of from about 5° to about 25° relative to a longitudinal axis of the respective shaft 130. In this way, the grips 154 of each of the handles 26, 28 may be angled toward one another when the handles 26, 28 are in the raised position 30. Additionally or alternatively, the grips 154 of the handles 26, 28 may pivot or rotate relative to the shafts 130 to allow the user or caregiver to position the grips 154 at various angles for use or storage. It is also contemplated that the grip 154 of each handle 26, 28 may extend along the longitudinal axis of the shaft 130, such that the grip 154 is a continuous linear extension of the distal end 146. The grips 154 may include one or more indents 158 to accommodate a hand of the user or caregiver. The indents 158 may define outer boundaries for the hand of the caregiver or features to form a more ergonomic grasp for the caregiver. It will be understood that the grip 154 on each handle 26, 28 may include a variety of features, including the controls 108 to operate the motorized unit 104 configured to move the patient support apparatus 10 in a forward, rearward, or sideways direction or adjust the upper frame 14B relative to the base frame 14A.

Each grip 154 may be in a fixed position relative to the shaft 130, or alternatively, the grips 154 may be adjustable relative to the shafts 130 to allow the frame 14 to accommodate different user heights. The user or caregiver may grasp the grip 154 at a comfortable position without raising or lowering the handles 26, 28 or the upper frame 14B. The grips 154 may be made of a polymeric, rubber-like material, which may include a thermoplastic elastomer (TPE). In some examples, the grip 154 is made of Santoprene™, which is a thermoplastic vulcanizate (TPV). It may be beneficial for the caregiver to push the handles 26, 28, such that the forearms of the caregiver may be generally parallel with the floor, which may include a position slightly below an elbow. Therefore, caregivers of different heights may benefit from positioning their hands on different locations of the handles 26, 28 or have the grips 154 at different angles in order to form a more ergonomic posture for pushing the patient support apparatus 10. As such, the grips 154 may be positioned on the handles 26, 28 and may be configured to accommodate more than one hand position or grip point.

Figure 5:
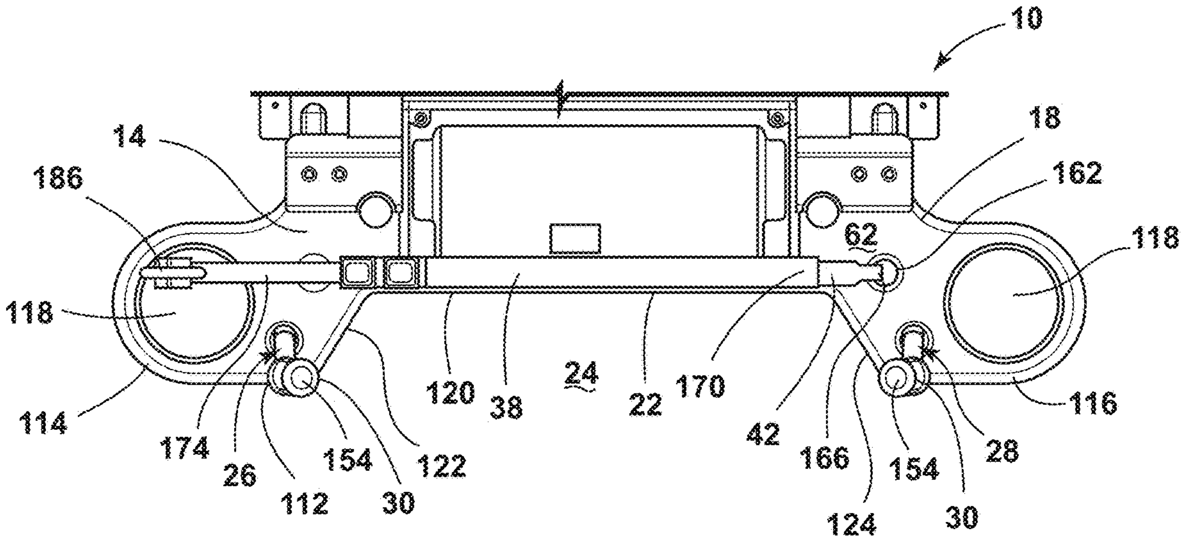
FIG. 5 is a top plan view of an elongate support member and handles fora patient support apparatus, with the elongate support member in a stowed position and the handles in a raised position, according to the present disclosure.
Figure 6:
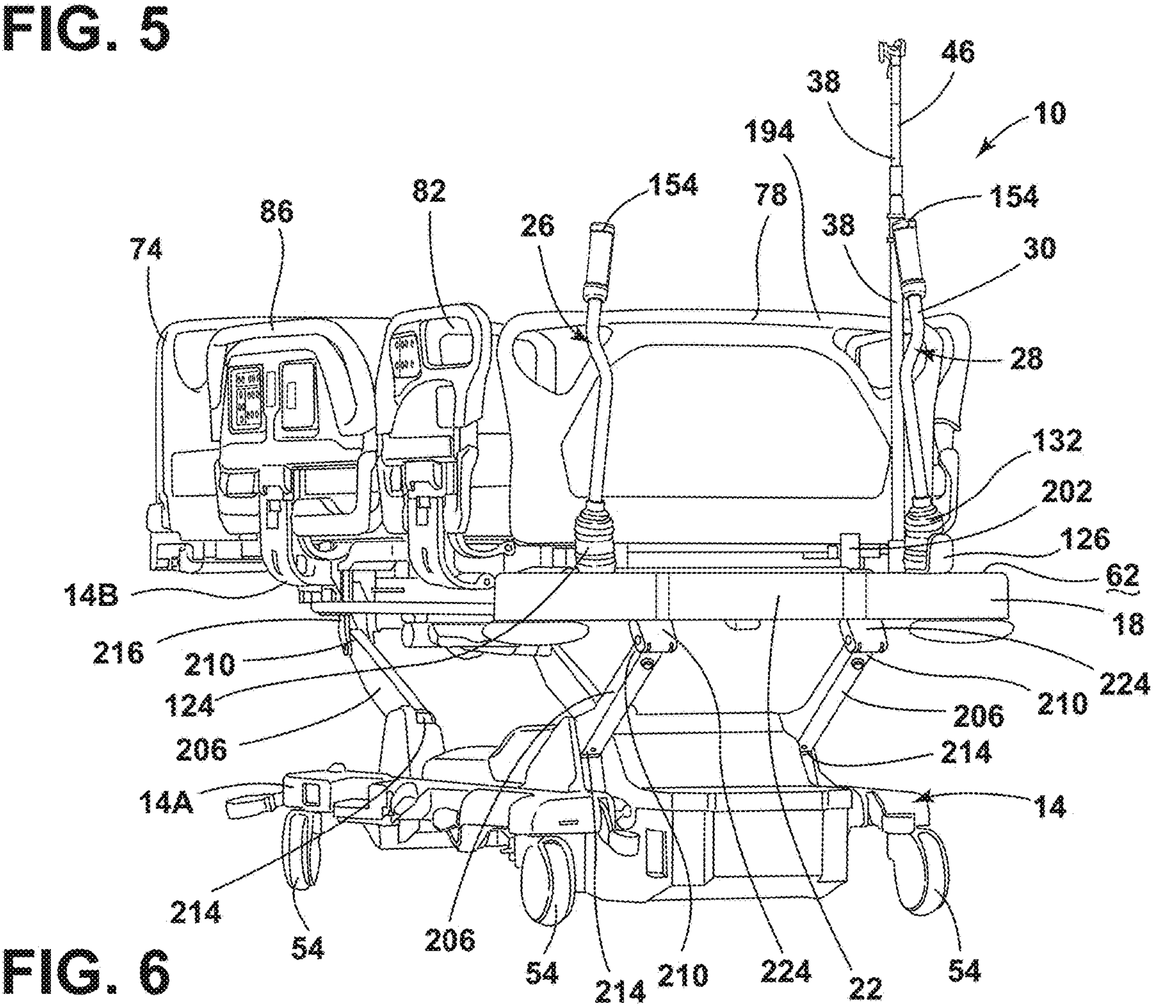
FIG. 6 is a front perspective view of a head portion of a patient support apparatus, according to the present disclosure.

Referring to FIGS. 5 and 6, the IV pole 38 is rotatably or pivotally coupled to the head portion 18 of the frame 14 on or proximate the side projection 116. The IV pole 38 may be coupled to the head portion 18 proximate either of the side projections 114, 116 or elsewhere on the frame 14. As illustrated, the elongate support member is configured as the IV pole 38, but may be configured to support other medical equipment or supplies without departing from the teachings herein. The IV pole 38 is operable between the stowed position 42, as illustrated in FIG. 5, and the deployed position 46, as illustrated in FIG. 6. The IV pole 38 may be in the form of a metal tube or shaft but is not limited to such constructions.

The IV pole 38 is configured to rotate downward into abutment or close proximity to the head portion 18 of the frame 14. The IV pole 38 includes a support base 162 that is secured to the head portion 18. The support base 162 is pivotally coupled to a proximal end 166 of the IV pole 38. The protective cover 132 (FIG. 1) in the form of the polymeric bellows may be disposed on a proximal portion 170 of the IV pole 38 over a pivoting or rotation assembly (e.g., a hinge, a ball-and-socket, etc.) coupling the IV pole 38 with the support base 162. The IV pole 38 is operable to rotate, or pivot, between the deployed position 46, where the IV pole 38 extends generally vertically, normal to a longitudinal extent of the frame 14, and the stowed position 42, where the IV pole 38 abuts or is in close proximity to the head portion 18, such that the IV pole 38 extends generally horizontally.

When in the stowed position 42, the IV pole 38 extends laterally across the support surface 62 of the frame 14 adjacent to, and inboard of, the rear wall 120 of the recessed edge 22. As illustrated, the IV pole 38 is disposed along and aligned with the rear wall 120. Accordingly, the IV pole 38 is disposed substantially over the frame 14. It is contemplated that the IV pole 38 may extend in another direction along the head portion 18 of the frame 14. In this way, the IV pole 38 does not substantially impinge the space 24 defined by the recessed edge 22 when in the stowed position 42 and when in the deployed position 46. As such, the positioning of the IV pole 38 relative to the recessed edge 22 provides increased access to the patient on the patient support apparatus 10.

Referring still to FIGS. 5 and 6, a length of the IV pole 38 may be adjustable. The IV pole 38 may telescopically expand and retract or otherwise be adjustable between expanded and retracted positions. As illustrated in FIG. 5, a distal portion 174 of the IV pole 38 extends at least partially across the opening 118 of the opposing side projections 114 relative to the position of the support base 162. An adjustable length may be advantageous for shortening the IV pole 38 when in the stowed position 42, such that the IV pole 38 may not substantially interfere with the opening 118 of the opposing side projection 116 of the frame 14. This may be further advantageous for storing the IV pole 38 in the stowed position 42 while storing medical supplies (e.g., oxygen tanks) in the openings 118 defined by the side projections 114, 116 of the frame 14. Additionally, the adjustable length of the IV pole 38 may prevent the IV pole 38 from extending beyond the outer edge 112 of the frame 14. The IV pole 38 may include a latch to retain the IV pole 38 at the selected length. In addition, the distal portion 174 of the IV pole 38 may include a hook 186 or similar structures, for retaining medical supplies (e.g., an IV bag).

According to various aspects, both the handles 26, 28 and the IV pole 38 may include a locking feature. The locking feature may retain the handles 26, 28 in the raised position 30 or the lowered position 34 and the IV pole 38 in the stowed position 42 or the deployed position 46. In this way, the handles 26, 28 and the IV pole 38 may not unintentionally move between positions during transportation of the patient support apparatus 10.

The space 24 defined by the recessed edge 22 provides increased access to the patient on the patient support apparatus 10. In addition, the headboard 78 may be removed by the caregiver to further increase access to the patient on the patient support apparatus 10. Stated differently, the headboard 78 may be adjusted between an engaged position 194, as illustrated in FIG. 6, and a disengaged position 198, as best illustrated in FIG. 4. In various examples, when in the engaged position 194, the headboard 78 is coupled to the head portion 18 of the frame 14 via retaining brackets 202. The headboard 78 may slidably engage the retaining brackets 202. The caregiver may slide the headboard 78 into the retaining brackets 202 to couple the headboard 78 to the frame 14 and slide the headboard 78 away from the retaining brackets 202 to remove the headboard 78. In the disengaged position 198, the headboard 78 may be removed from the patient support apparatus 10.

Figure 7:
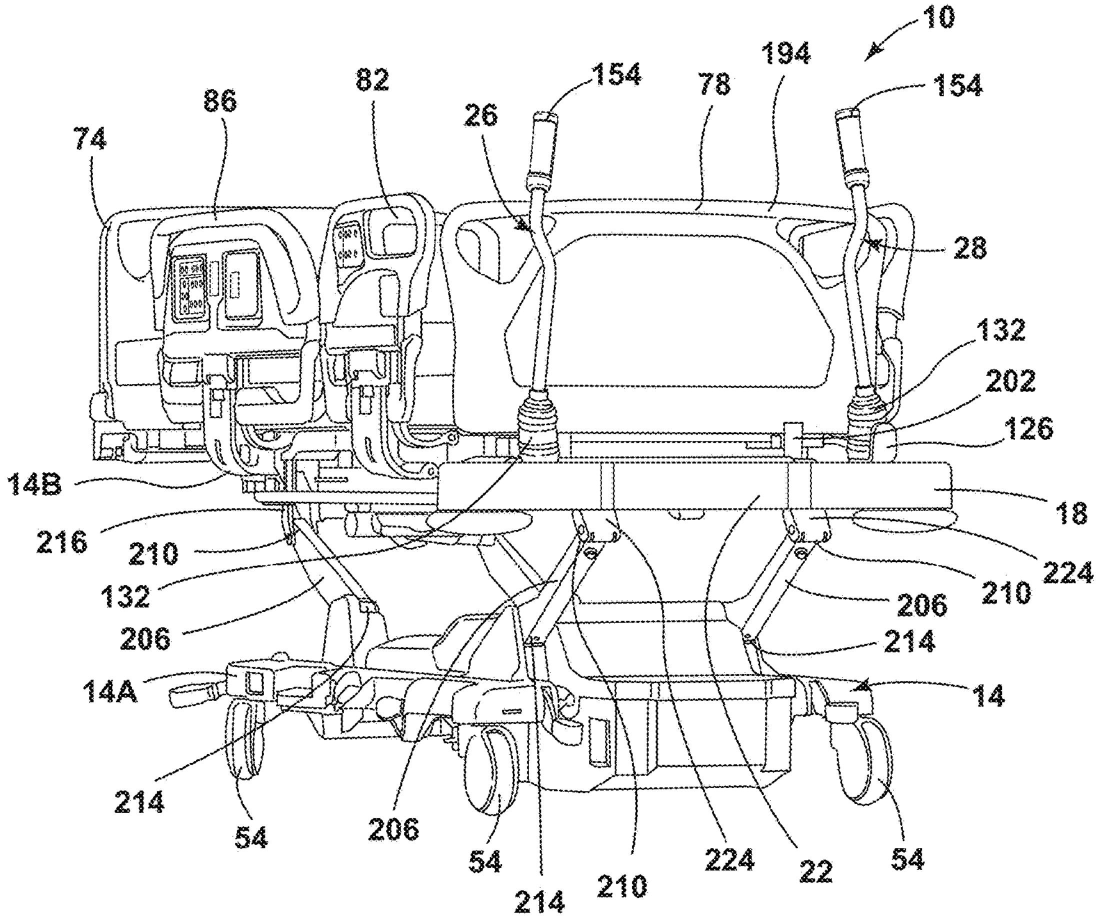
FIG. 7 is a front perspective view of a patient support apparatus, according to the present disclosure.

Referring still to FIG. 7, the patient support apparatus 10 includes multiple lift arms 206 disposed between the base frame 14A and the upper frame 14B. It is contemplated that the patient support apparatus 10 may include a single lift arm 206 without departing from the teachings herein. The lift arms 206 are operably coupled to the base frame 14A and the upper frame 14B and operate to raise, lower, and tilt the upper frame 14B relative to the base frame 14A. Each lift arm 206 includes an upper joint 210 proximate to the upper frame 14B and a lower joint 214 proximate to the base frame 14A. The upper and lower joints 210, 214 provide a connection point and a point of rotation of the lift arms 206 relative to the base frame 14A and the upper frame 14B, respectively. In the illustrated configuration, the upper frame 14B includes brackets 216 that define the upper joint 210, and the base frame 14A integrally defines the lower joint 214. However, any practicable configuration (e.g., the brackets 216, integrally defined joints 210, 214, etc.) may be utilized for pivotally coupling the lift arms 206 to the base frame 14A and the upper frame 14B. The lift arms 206 include metal materials, metal alloy materials, or other similar materials.

Figure 8:
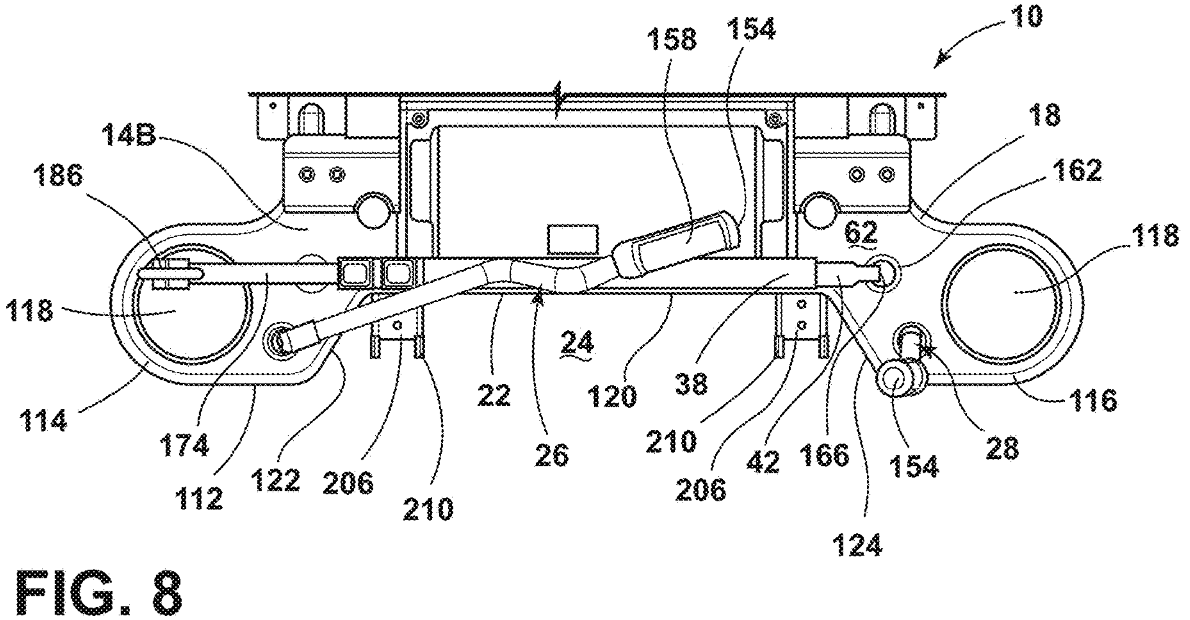
FIG. 8 is a top plan view of an elongate support member and handles fora patient support apparatus, with the elongate support member in a stowed position, one handle in a raised position, and one handle in a lowered position, according to the present disclosure.

Referring still to FIG. 7 as well as FIG. 8, the lift arms 206 may extend beyond the rear wall 120 of the frame 14 and impinge the space 24 defined by the recessed edge 22. The rear wall 120 and the sidewalls 122, 124 of the recessed edge 22 define the space 24. The space 24 extends vertically from the floor surface to a ceiling surface. Accordingly, the space 24 accommodates the caregiver when the caregiver is adjacent the recessed edge 22 and is not limited to the space 24 directly between the sidewalls 122, 124. In this way, the lift arms 206 extending into the space 24 below the upper frame 14B may interfere with the caregiver accessing the patient on the patient support apparatus 10. Moreover, the lift arms 206 may limit the ability of the caregiver to move around within the space 24 defined by the recessed edge 22 to access the patient on the patient support apparatus 10. The upper joint 210 may extend different distances beyond the rear wall 120 depending on the angle of the lift arms 206 as determined by the position of the upper frame 14B relative to the base frame 14A. Legs of the caregiver or other user may contact the lift arms 206 or the upper joints 210 that protrude beyond the rear wall 120. As such, the cover 50 may be coupled to the frame 14 and extend outward, into the space 24 defined by the recessed edge 22, and vertically over the lift arms 206 to prevent contact between the caregiver and the lift arms 206.

Figure 9:
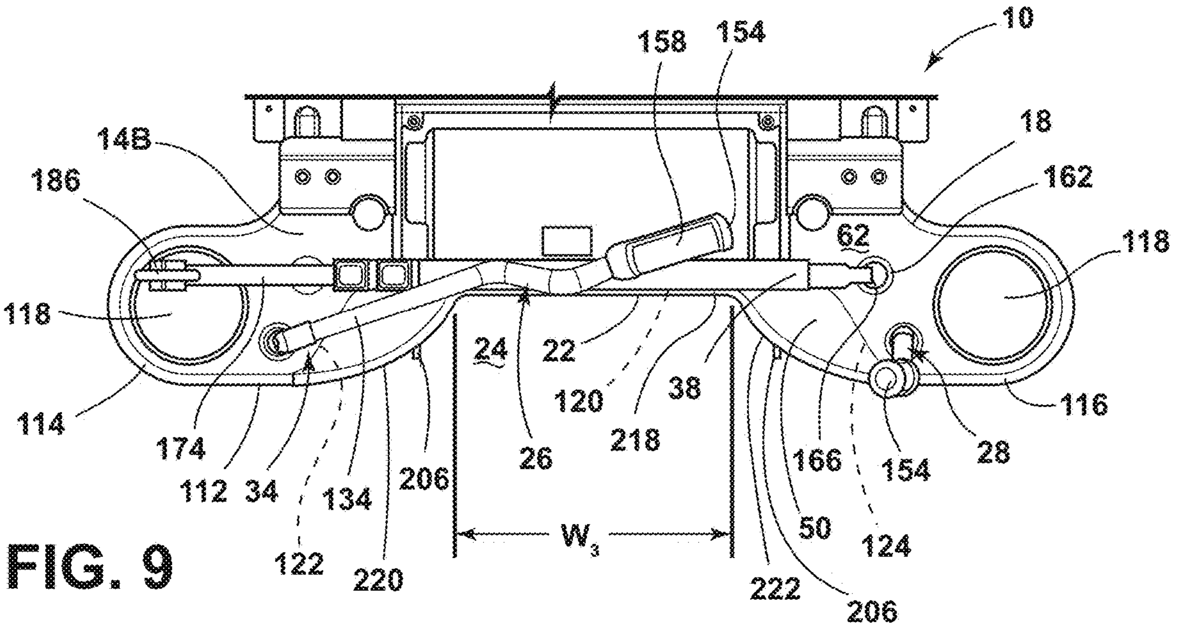
FIG. 9 is a top plan view of an elongate support member and handles disposed over a cover for a patient support apparatus, with the elongate support member in a stowed position, one handle in a raised position, and one handle in a lowered position, according to the present disclosure.

Referring to FIG. 9, the cover 50 is disposed on the head portion 18 of the frame 14 and generally aligns with the frame 14 to at least partially define the space 24. The cover 50 may extend over the entire, or a substantial portion, of the head portion 18 of the frame 14, or alternatively, may be coupled directly to the outer edge 112 of the frame 14. The cover 50 may be a single component or, alternatively, may be multiple components disposed on the head portion 18 of the frame 14. According to various aspects, the cover 50 aligns with the rear wall 120 and extends from the side projections 114, 116, over the sidewalls 122, 124 of the recessed edge 22, and into the space 24 defined by the recessed edge 22. A rear wall 218 of the cover 50 vertically aligns with the rear wall 120 of the recessed edge 22, and sides 220, 222 of the cover 50 are spaced-apart from the sidewalls 122, 124 of the recessed edge 22. Accordingly, the cover 50 narrows the space 24 defined by the recessed edge 22 to a width $W_3$ but does not substantially reduce the depth of the space 24 (e.g., the depth of the space 24 defined by the recessed edge 22 is maintained).

From a top view of the frame 14, the cover 50 substantially obscures the lift arms 206 from view. The sides 220, 222 disposed within the space 24 defined by the recessed edge 22 are vertically aligned with the portions of the lift arms 206 that extend into the space 24. The cover 50 may prevent the caregiver from moving within the space 24 in a way that would cause the caregiver to contact the lift arms 206. The cover 50 may prevent or impede the caregiver from contacting the lift arms 206.

Additionally or alternatively, the proximal portion 134 of the handles 26, 28 may extend at least partially into or through the space 24 defined by the recessed edge 22 when in the lowered position 34 adjacent to the intersections between the sidewalls 122, 124 and the rear wall 120, respectively, as best illustrated in FIG. 8. The addition of the cover 50 to the head portion 18 of the frame 14 results in the proximal portions 134 of the handles 26, 28 extending over the cover 50, thereby reducing the interference of the handles 26, 28 within the space 24 defined by the recessed edge 22. The cover 50 narrows the width $W_3$ of the space 24 defined by the recessed edge 22, such that the lift arms 206 and the proximal portions 134 of the handles 26, 28 may not substantially impinge the space 24 defined by the recessed edge 22. This configuration may provide for increased access for the caregiver at the head portion 18 of the patient support apparatus 10 while reducing interference from the handles 26, 28 or the lift arms 206.

Figure 10:
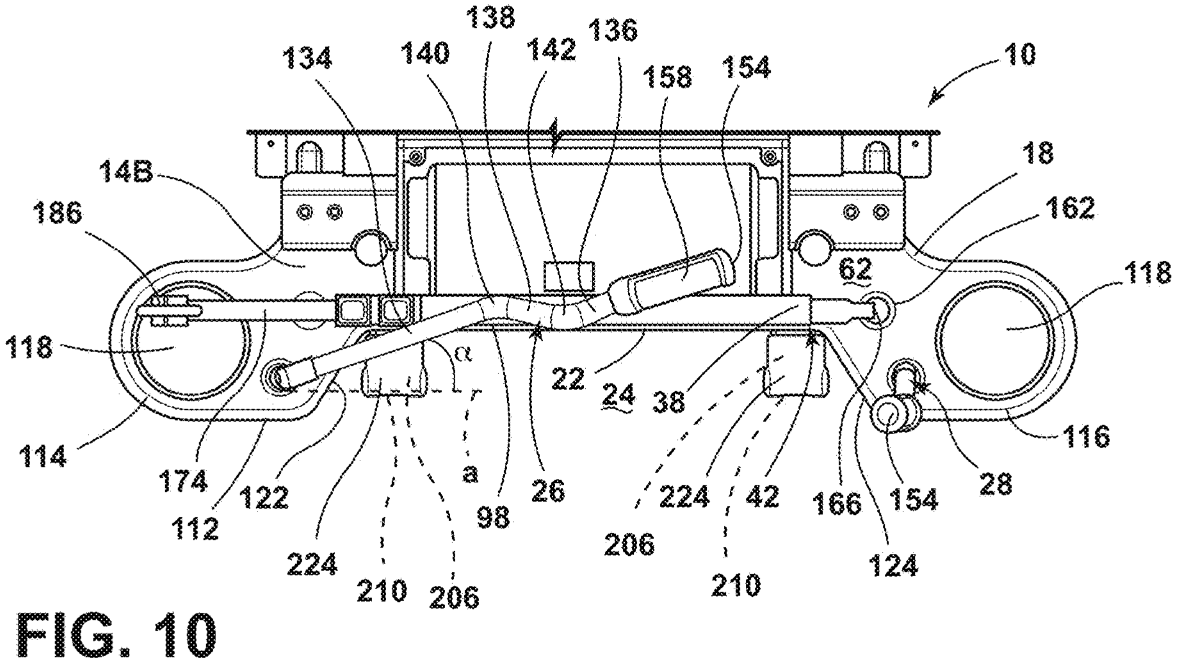
FIG. 10 is a top plan view of a head portion of a patient support apparatus, according to the present disclosure.
Figure 11A:
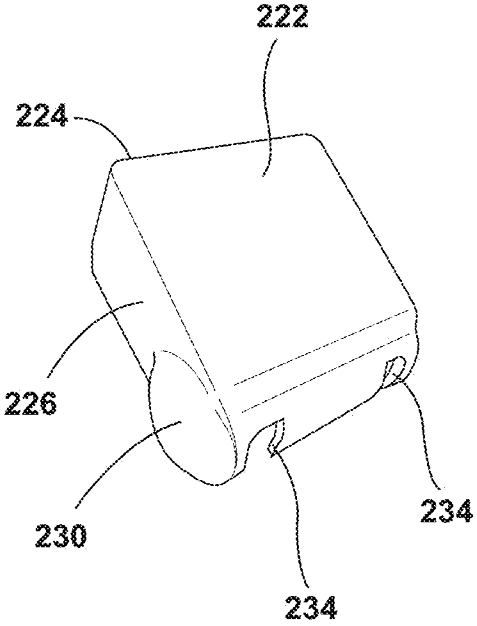
FIG. 11A is a front perspective view of a bumper for a patient support apparatus, according to the present disclosure.
Figure 11B:
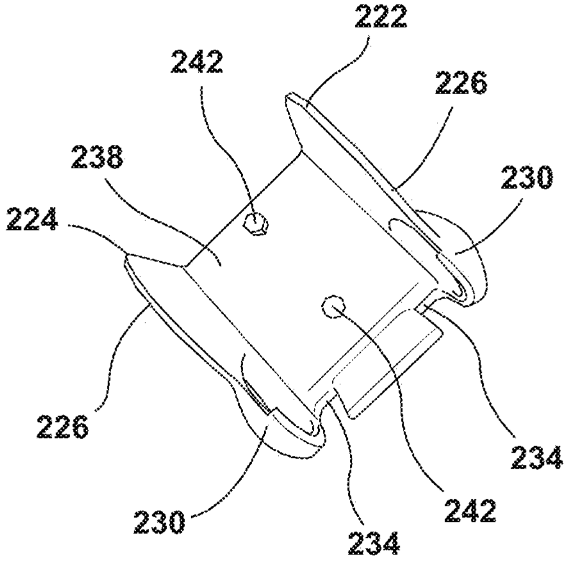
FIG. 11B is a rear perspective view of the bumper of FIG. 11A.

Referring to FIGS. 10-11B, in various examples, bumpers 224 are coupled to one or more of the lift arms 206. As illustrated, the bumpers 224 are coupled to the upper joints 210 of the lift arms 206 proximate the head portion 18 of the patient support apparatus 10, which may be the portions of the lift arms 206 that the caregiver is most likely to contact in the space 24 defined by the recessed edge 22. Specifically, the bumpers 224 are constructed of a pliable material with shock-absorbing properties. The bumpers 224 prevent the caregiver from directly striking the lift arms 206 while moving in the space 24 defined by the recessed edge 22. If the caregiver contacts the patient support apparatus 10 while providing treatment to the patient, the caregiver generally contacts the bumpers 224, which minimizes the potential for injurious contact that may be caused by direct contact with the lift arms 206. It is also contemplated that the bumpers 224 may also be coupled to other lift arms 206 (e.g., proximate the foot portion 70) or in other locations on the lift arms 206 (e.g., on the lower joints 214) of the patient support apparatus 10. The bumpers 224 may be advantageous for protecting the upper joints 210 of the lift arms 206, as well as for protecting the caregiver from directly contacting the lift arms 206. The bumpers 224 may include low durometer materials, such as, for example, plastics, urethanes, rubbers, or other similar materials. In some examples, the bumpers 224 may include Santoprene™.

The bumpers 224 generally have a substantially rectangular or trapezoidal shape, however, the bumpers 224 may have any practicable shape that does not substantially interfere with the articulation of the upper and lower joints 210, 214. Sides 226 of the bumpers 224 each define a protrusion 230, such that the shape of the bumpers 224 flares outward at one end. The protrusions 230 may be substantially similar, such that the bumpers 224 are symmetrical. The protrusions 230 are generally positioned over and cover pivoting fasteners of the lift arms 206. As best shown in FIG. 11B, the protrusions 230 are hollow, such that the pivoting fasteners of the lift arms 206 are disposed within the protrusions 230 and the bumpers 224 do not substantially interfere with the movement of the pivoting fasteners or the lift arms 206.

Additionally or alternatively, the bumpers 224 define grooves 234 proximate the protrusions 230. The grooves 234 generally accommodate rotation and other movements of the bumpers 224 and the lift arms 206 as the lift arms 206 raise, lower, or tilt the upper frame 14B. The protrusions 230 and the grooves 234 may be advantageous for providing greater flexibility and range of motion to the bumpers 224 to cover the upper or lower joints 210, 214 while the lift arms 206 are in motion or in different positions.

As best illustrated in FIG. 11B, an interior surface 238 of the bumpers 224 defines snap features 242 to couple the bumpers 224 to the lift arms 206. Two snap features 242 are coupled to the bumper 224, however, any number of snap features 242 may be used to couple the bumpers 224 to the lift arms 206. The snap features 242 selectively engage with corresponding apertures or grooves in the lift arms 206. In this way, the bumpers 224 may be quickly added and removed from the lift arms 206 by the caregiver or other user. In another example, the bumpers 224 may be mechanically fastened to the lift arms 206. The bumpers 224 may be coupled via bolts, screws, pins, or other similar mechanical fasteners. In some examples, the mechanical fasteners may be Christmas Tree™ fasteners or other push fasteners, shoulder screws, shoulder bolts, separate snap features, or self-tapping shoulder screws. Additionally or alternatively, the bumpers 224 may be adhered to the lift arms 216. The bumpers 224 may be used in combination with or independently of the cover 50.

Figure 12A:
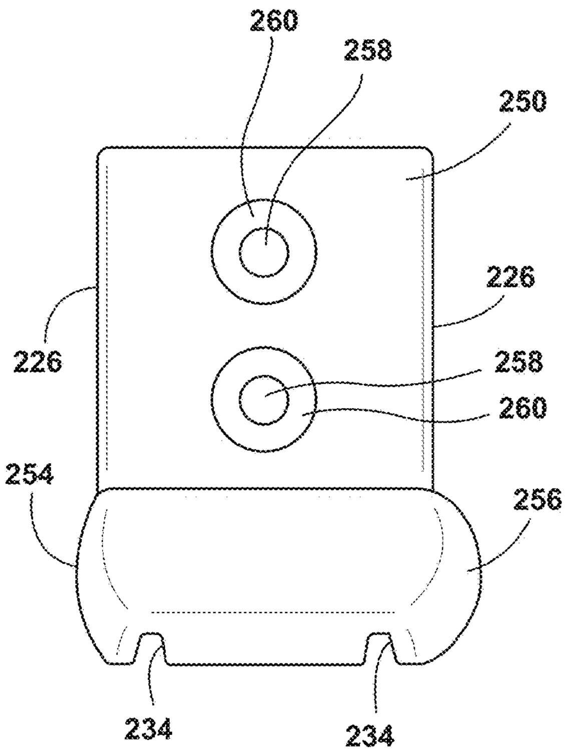
FIG. 12A is a front elevational view of a bumper for a patient support apparatus, according to the present disclosure.
Figure 12B:
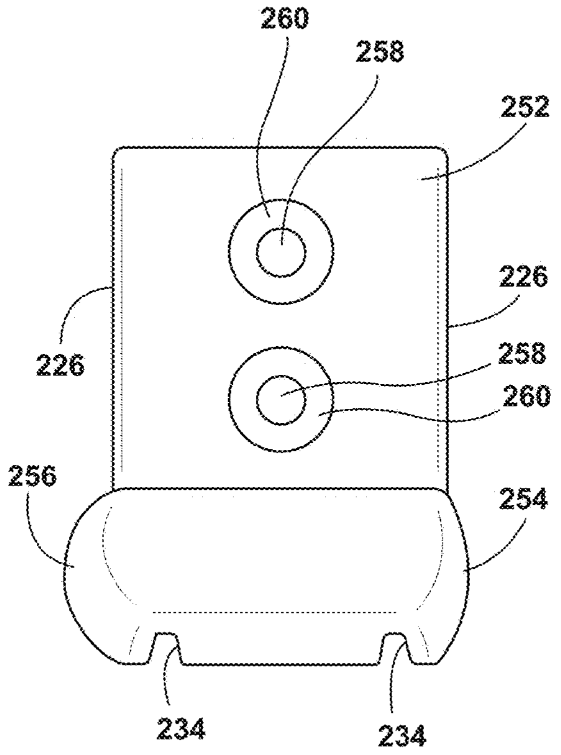
FIG. 12B is a front elevational view of a bumper for a patient support apparatus, according to the present disclosure.

Referring to FIGS. 12A and 12B, the patient support apparatus 10 may include asymmetrical bumpers 250, 252 operably coupled to the lift arms 206. The bumpers 250, 252 are generally mirror images of one another and disposed on opposing sides of the patient support apparatus 10 (e.g., left and right bumpers 250, 252). Each bumper 250, 252 includes protrusions 254, 256 extending from the sides 226 adjacent to one of the ends. The protrusions 254, 256 are hollow to accommodate a pivoting fastener of the lift arms 206. The protrusion 254 generally has a depth less than a depth of the protrusion 256. The protrusions 254, 256 may accommodate pivoting fasteners of different sizes. The different depths of the protrusions 254, 256 may prevent the bumpers 250, 252 from impeding the articulation of the lift arms 206 between different positions. The bumpers 250, 252 also define the grooves 234 proximate the protrusions 254, 256. The grooves 234 accommodate rotation and other movements of the bumpers 250, 254 and the lift arms 206 as the lift arms 206 raise, lower, or tilt the upper frame 14B. The bumpers 250, 252 may be used in combination with or independently of the cover 50.

The bumpers 250, 252 may be coupled to the lift arms 206 via a separate snap feature or other similar fasteners. Each bumper 250, 252 defines apertures 258 for receiving the snap feature. The apertures 258 may each be defined in a recessed portion 260. The recessed portion 260 may be advantageous for accommodating the snap feature. Accordingly, when the bumpers 250, 252 are engaged with the lift arms 206 via the snap features, the snap features are flush with an outer surface of the bumpers 250, 252. The snap feature being flush with the outer surface of the bumpers 250, 252 prevents injurious contact between the snap feature and the caregiver moving in the space 24 defined by the recessed edge 22. Accordingly, if the caregiver contacts the patient support apparatus 10, the caregiver may directly contact the bumpers 250, 252. Each bumper 250, 252 may include any practicable number of apertures 258 and recessed portions 260 for coupling the bumpers 250, 252 to the lift arms 206.

Use of the present disclosure may provide for a variety of advantages. For example, the head portion 18 that includes the recessed edge 22 provides additional or increased access to the patient on the patient support apparatus 10. Additionally, the handles 26, 28 may not substantially impinge with the space 24 defined by the recessed edge 22 when the handles 26, 28 are in the raised or lowered position 30, 34. The shape or rotation of the handles 26, 28 allows the handles 26, 28 to be disposed over the frame 14 when in the lowered position 34 and reduce interference of the handles 26, 28 with the caregiver moving within the space 24 defined by the recessed edge 22. Further, the placement of the IV pole 38 reduces or minimizes interference of the IV pole 38 in the space 24 defined by the recessed edge 22 when the IV pole 38 is in the deployed or stowed position 42, 46. Moreover, the cover 50 coupled to the head portion 18 of the frame 14 extends over the lift arms 206 to reduce direct contact between the caregiver and the lift arms 206. Additionally, the bumpers 224 coupled to the lift arms 206 reduce direct contact between the caregiver and the lift arms 206 or the upper joints 210. Additional benefits or advantages of using this device may also be realized and/or achieved.

According to another aspect of the present disclosure, a patient support apparatus includes a base frame. An upper frame is operably coupled to the base frame. The upper frame has a support surface configured to support a mattress. The upper frame has a head portion that includes a recessed edge. Lift arms are coupled to the upper frame and configured to adjust a position of the upper frame relative to the base frame. A first handle is coupled to the head portion on a first side of the recessed edge. A second handle is coupled to the head portion on a second side of the recessed edge. The first and second handles are configured to pivot inboard and toward one another to a lowered position and extend over the upper frame adjacent to the recessed edge. An intravenous pole is pivotally coupled to the head portion. The intravenous pole is adjustable between a deployed position and a stowed position. The intravenous pole extends along a rear wall of the recessed edge over the upper frame when in the stowed position.

According to another aspect, a cover is coupled to a head portion. The cover aligns with a rear wall of a recessed edge and extends over opposing sidewalls of the recessed edge into a space defined by the recessed edge.

According to another aspect, lift arms extend into a space defined by a recessed edge. Sides of a cover are disposed vertically over the lift arms within the space.

According to another aspect, at least one of first and second handles includes controls operably coupled with a drive system.

According to another aspect, each of first and second handles includes a proximal portion coupled to a connecting portion via a proximal bend and a distal portion coupled to the connecting portion via a distal bend.

According to another aspect, a connecting portion, a distal bend, and a proximal bend of each of first and second handles are disposed over an intravenous pole when the first and second handles are in a lowered position and the intravenous pole is in a stowed position.

According to another aspect of the present disclosure, an access and transport assembly for a patient support apparatus includes a frame that has a head portion that includes a recessed edge. The recessed edge has first and second sidewalls each extending at an oblique angle from a rear wall. A cover is coupled to the frame proximate the recessed edge. The cover extends over the first and second sidewalls into a space defined by the recessed edge. A first handle is coupled to the head portion adjacent the first sidewall of the recessed edge. A second handle is coupled to the head portion adjacent the second sidewall of the recessed edge. Each of the first and second handles extends at an inboard angle over the cover and at least partially along the rear wall when in a lowered position.

According to another aspect, an inboard angle is in a range of from 10° to 30° relative to a lateral axis that extends between the first and second handles.

According to another aspect, a lift arm is operably coupled to a frame and is configured to adjust a position of the frame. The lift arm at least partially extends into a space defined by a recessed edge. The cover extends over the lift arm in the space.

According to another aspect, a bumper is operably coupled to a lift arm in a space defined by a recessed edge.

According to another aspect, an elongate support member is coupled to a head portion. The elongate support member extends over the frame parallel to a rear wall of a recessed edge when in a stowed position.

According to another aspect, first and second handles are configured to pivot at an inboard angle in a range of from 10° to 30° relative to a lateral axis parallel to a rear wall of the recessed edge. The first and second handles are at least partially disposed over an elongate support member when the elongate support member is in a stowed position and the first and second handles are in a lowered position.

According to another aspect of the present disclosure, a frame includes a recessed edge. The recessed edge has a rear wall and sidewalls each extending at an obtuse angle from the rear wall. A lift arm is coupled to the frame at a joint proximate the recessed edge. The lift arm is configured to adjust a position of the frame. The lift arm selectively extends into a space defined by the recessed edge. A bumper is coupled to the lift arm proximate the joint. The bumper covers a portion of the lift arm that selectively extends into the space. A handle is coupled to the frame proximate the recessed edge. The handle is configured to pivot inboard to extend at least partially along the rear wall when in a lowered position.

According to another aspect, a bumper defines a protrusion proximate one end. The protrusion is hollow and configured to accommodate a fastener on a lift arm.

According to another aspect, a bumper defines a groove on one end. The groove is configured to increase a range of motion of the bumper as a lift arm articulates between different positions.

According to another aspect, a cover is coupled to a head portion of a frame. The cover narrows a width of a space defined by a recessed edge and maintains a substantially same depth of the space.

According to another aspect, sides of a cover extend over sidewalls of a recessed edge. The sides of the cover are disposed vertically over a lift arm within a space defined by the recessed edge.

According to another aspect, a handle extends over a frame at an inboard angle in a range from 10° to 30° relative to a lateral axis parallel to a rear wall of a recessed edge.

According to another aspect, a handle includes a proximal portion, a connecting portion, and a distal portion. The proximal portion is coupled to the connecting portion via a proximal bend that defines an obtuse angle and the distal portion is coupled to the connecting portion via a distal bend that defines an obtuse angle.

According to another aspect, a handle includes a base coupled to a proximal end and a grip coupled to a distal end. Proximal and distal bends are disposed closer to the grip than the base.

It will be understood by one having ordinary skill in the art that construction of the described disclosure and other components is not limited to any specific material. Other exemplary embodiments of the disclosure disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A frame assembly for a patient support apparatus, comprising:

a base frame;

an upper frame operably coupled to the base frame, wherein the upper frame has a head portion with a recessed edge that includes opposing sidewalls extending from a rear wall to define an access space that extends into the upper frame;

a cover coupled to the head portion, wherein the cover includes a rear wall and opposing sides, and wherein the opposing sides extend over the opposing sidewalls to narrow the access space; and lift arms operably coupled to the base frame and the upper frame to adjust the upper frame relative to the base frame, wherein the opposing sides of the cover are disposed over the lift arms.

2. The frame assembly of claim 1, wherein the rear wall of the cover aligns with the rear wall of the recessed edge to maintain a depth of the access space.

3. The frame assembly of claim 1, wherein the opposing sidewalls extend at obtuse angles from the rear wall of the recessed edge.

4. The frame assembly of claim 1, further comprising:

a handle coupled to the head portion, wherein the handle is operable between a stowed position and a deployed position, and wherein the handle extends over the cover and adjacent to the rear wall of the cover when in the stowed position.

5. The frame assembly of claim 1, further comprising:

a headboard selectively coupled to the head portion, wherein the headboard is operable between an engaged position when coupled to the head portion and a disengaged position when removed from the upper frame.

6. The frame assembly of claim 1, further comprising:

bumpers coupled to the lift arms, respectively, wherein the bumpers are disposed at points of rotation for the lift arms.

7. The frame assembly of claim 1, wherein the recessed edge is defined between outwardly extending side projections.

8. A frame assembly for a patient support apparatus, comprising:

a base frame;

an upper frame operably coupled to the base frame;

a bracket coupled to the upper frame;

a lift arm operably coupled to the base frame and the bracket, wherein a joint is defined by the bracket and the lift arm to form a point of rotation for the lift arm, and wherein the lift arm is configured to adjust the upper frame relative to the base frame; and a bumper operably coupled to the lift arm at the joint.

9. The frame assembly of claim 8, further comprising:

a cover coupled to a head portion of the base frame, wherein a side of the cover extends over the lift arm.

10. The frame assembly of claim 8, wherein the upper frame has a head portion with a recessed edge that includes opposing sidewalls extending from a rear wall to define an access space that extends into the upper frame.

11. The frame assembly of claim 10, further comprising:

a handle operably coupled to the head portion, wherein the handle extends adjacent to the recessed edge when in a lowered position.

12. The frame assembly of claim 10, wherein the opposing sidewalls extend at obtuse angles from the rear wall.

13. The frame assembly of claim 8, wherein each side of the bumper defines a protrusion for receiving a fastener of the lift arm.

14. The frame assembly of claim 13, wherein the bumper defines a groove proximate to each protrusion to allow for movement of the lift arm.

15. A frame assembly for a patient support apparatus, comprising:

a base frame;

an upper frame operably coupled to the base frame, wherein the upper frame has a head portion with a recessed edge that includes first and second sidewalls extending from a rear wall to define an access space that extends into the upper frame;

a cover coupled to the head portion, wherein the cover includes a rear wall and opposing sides, and wherein the opposing sides extend over the first and second sidewalls to narrow the access space;

a first handle operably coupled to the head portion proximate to the first sidewall; and a second handle operably coupled to the head portion proximate to the second sidewall, wherein the first and second handles are configured to rotate at an inboard angle from a deployed position to a stowed position, and wherein the first and second handles extend adjacent to the rear wall of the recessed edge when in the stowed position.

16. The frame assembly of claim 15, wherein a first width is defined between the first and second handles when the first and second handles are in the deployed position, and wherein the access space has a second width defined by the first and second sidewalls, and further wherein the first width is greater than the second width.

17. The frame assembly of claim 15, further comprising:

an intravenous pole operably coupled to the head portion, wherein the intravenous pole is operable between a stowed position and a deployed position, and wherein the intravenous pole extends adjacent to the rear wall of the recessed edge when in the stowed position.

18. The frame assembly of claim 17, wherein the first and second handles are stacked over the intravenous pole when the first and second handles and the intravenous pole are each in the stowed position, respectively.

19. The frame assembly of claim 15, further comprising:

a lift arm operably coupled to the base frame and the upper frame to adjust the upper frame relative to the base frame, wherein at least one of the opposing sides of the cover is disposed over the lift arm.

* * * * *